United States Patent [19]

Barabash et al.

[11] Patent Number: 6,028,892
[45] Date of Patent: Feb. 22, 2000

[54] VOICE BAND-BASED DATA TRANSMISSION SYSTEM

[75] Inventors: Darrell Barabash, Grapevine; Russell Morris, Keller, both of Tex.

[73] Assignee: JRC Canada, Fort Worth, Tex.

[21] Appl. No.: 08/698,100

[22] Filed: Aug. 15, 1996

[51] Int. Cl.[7] ................................ H04B 1/38
[52] U.S. Cl. .............................. 375/222; 455/422
[58] Field of Search .......................... 375/222, 377; 455/403, 422

[56] References Cited

U.S. PATENT DOCUMENTS 4,654,867  3/1987  Labedz et al. .................. 379/59
5,682,602  10/1997  Walker et al. .................. 375/222

*Primary Examiner*—Temesghen Ghebretinsae
*Attorney, Agent, or Firm*—Cesari and McKenna, LLP

[57] ABSTRACT

A radiotelephone system provides a voice channel for carrying voice signals between a mobile unit and a called or calling unit. A first modem in the mobile unit and a second modem connected to a point along the voice channel employ a "blank-and-burst" method of communication to provide a data channel between a first data device connected to the mobile unit and a second data device connected to the second modem. The data channel enables the data devices to communicate with each other seemingly concurrently, and with minimal interference, with the voice signals that are being carried over the voice channel and without requiring modifications to any base station.

28 Claims, 5 Drawing Sheets

VOICE BAND-BASED DATA TRANSMISSION SYSTEM

BACKGROUND OF THE INVENTION

1. Field of the Invention

The invention relates to cellular telephone systems, and more particularly, to such systems in which data is communicated over a voice channel between a mobile telephone unit and another unit.

2. Description of the Related Art

Data and command signals, as distinct from voice signals, can be sent to and from a mobile telephone unit in a variety of ways and for a variety of purposes. For example, it is well known to use modems with cellular telephones to send and receive computer data and facsimiles. In addition, cellular telephone systems send commands to a mobile unit during call setup and once a call is in progress, e.g. to command the mobile unit to change its transmitter frequency or power level.

A growing demand for mobile electronic productivity tools, e.g. facsimile machines and computers, has created a need for a general purpose data channel that is concurrently available to one or more devices connected to a mobile telephone unit. Currently, when these devices require a data channel, they can initiate and accept calls over the mobile telephone unit using modems to carry the data in the voice bands of the voice channels. However, some users would prefer this data communication to occur in the "background" during normal cellular telephone calls initiated or received by the user of the mobile telephone unit. Furthermore, these users would prefer that several devices' data communication needs be satisfied concurrently during any call.

Similarly, some service providers would prefer to exchange data or commands with a mobile unit or devices connected to the mobile unit concurrently with the normal voice signals carried over the voice channel. For example, some service providers would prefer to send text messages or to remotely monitor various conditions, such as the geographic location of a mobile unit, over a voice channel while a user converses over the channel, without intervention by the user. Problematically, conventional modems do not permit such data exchanges to occur concurrently with normal voice traffic. Providing such capabilities through changes to the cellular control channel or to the voice channel signaling scheme would require regulatory approval and/or changes to installed base station circuitry.

SUMMARY OF THE INVENTION

The invention is a cellular telephone system that employs modems in a "blank-and-burst" mode to provide a data channel over a voice channel, seemingly concurrently and with minimal interference with speech signals carried over the voice channel. A modem in the mobile unit communicates with a second modem by sending and receiving bursts of data over the voice channel. The system disables the normal audio path during each data burst to avoid voice-signal interference with the data burst, however the data bursts do not significantly degrade the normal speech signals because they are short, i.e., generally much less than one second in duration.

The modems overcome the problem of distinguishing data signals from voice signals by continually sampling the signal carried over the voice channel to detect the beginning of each data burst. Each data burst contains a predetermined pattern of bits (a "synchronization word") that enables the receiving modem to identify the data burst. The bit pattern of the synchronization word is chosen to minimize the probability that normal signals carried over the voice channel, e.g., speech, facsimile signals or computer modem signals, contain the modulated-equivalent of the synchronization word.

"Data device" herein means any device that sends and/or receives digital data and/or commands, such as a computer, printer, global positioning system (GPS) receiver or microcontroller that interfaces with an auxiliary control or measurement device. Accordingly, data devices located in or connected to a mobile unit ("local data devices") can communicate over the novel data channel with other data devices ("remote data devices") that are connected anywhere along the voice channel, including along the public switched telephone network (PSTN), established for a call-in-progress. Each pair of data devices communicates over an effectively error-free logical data link over the data channel. The system preferably employs a multiple-layer protocol to provide the multiple, concurrent logical data links over the single data channel and to facilitate developing application software and hardware that utilize the logical links. The data channel facilitates delivering services, including those requiring simultaneous data and voice communication.

BRIEF DESCRIPTION OF THE DRAWINGS

The above and further advantages of the invention may be better understood by referring to the following description in conjunction with the accompanying drawings, in which.

DESCRIPTION OF THE PREFERRED EMBODIMENT

Figure 1:
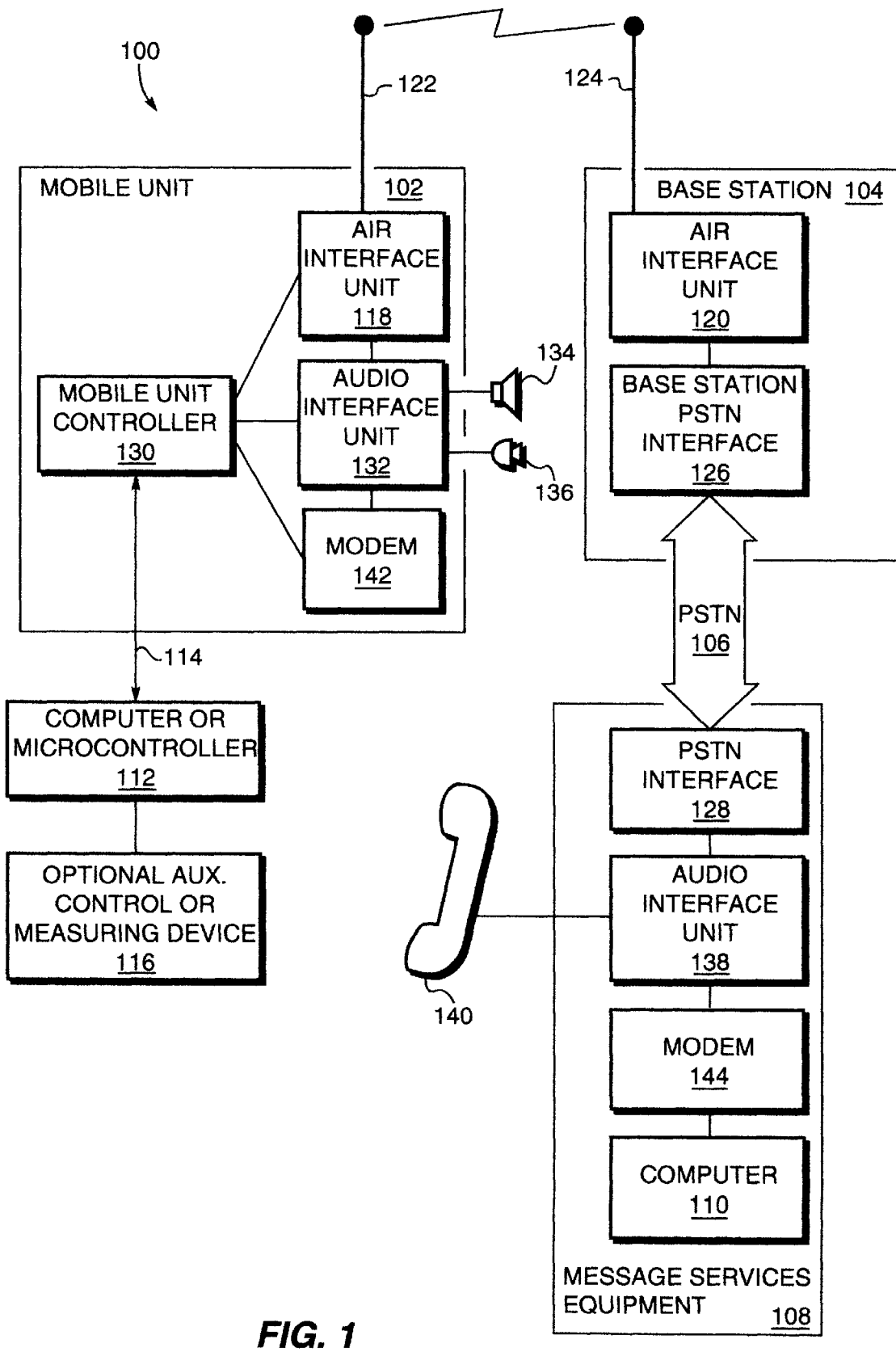
FIG. 1 is a block diagram of a wireless communication system according to the present invention.

FIG. 1 depicts a radiotelephone system 100 according to the present invention, in which a mobile unit 102 is in two-way radio communication with a base station 104 and has been connected via a public switched telephone network (PSTN) 106 to message services equipment 108 for the purpose of providing both voice and data communication to a user of the mobile unit. A computer 110 located in the message services equipment 108 sends and receives data messages to or from a computer or microcontroller 112 connected to the mobile unit 102 via a data interface 114. The computer 112 can optionally be connected to an auxiliary control or measurement device 116.

Conventional air interface units 118 and 120 in the mobile unit 102 and the base station 104, respectively, together with antennas 122 and 124 provide a voice channel between the mobile unit and the base station and handle such functions as selecting a radio frequency and transmitter power level for the voice channel. A base station PSTN interface 126 extends the voice channel over the PSTN 106 through a second PSTN interface 128 to the message services equipment 108. "Voice channel" herein means the audio frequency channel between the mobile unit 102 and a called or calling unit, e.g., the message services equipment 108.

Under the control of a mobile unit controller 130, an audio interface unit 132 selectively connects a speaker 134 and a microphone 136 to the voice channel, as described below. Similarly, an audio interface unit 138 in the message services equipment 108 selectively connects a handset 140 to the voice channel. When the speaker 134, microphone 136 and handset 140 are connected to the voice channel, the user of the mobile unit 102 can converse with a party located at the message services equipment 108. Of course, the voice channel can carry other signals, such as conventional computer modem signals and facsimile signals, as well as speech signals. All conventional user-initiated signals carried over the voice channel are herein collectively referred to as "voice signals."

A modem 142 in the mobile unit 102 and a modem 144 in the message services equipment 108 can each be selectively connected to the voice channel and thus provide a data channel over which the computer 110 can communicate with the computer 112. Various types of modems, such as quadrature amplitude modulation (QAM) modems can be used, but we prefer to use an audio frequency-shift keying (AFSK) modem because AFSK is less sensitive to imperfections in the voice channel and is generally more cost effective.

The modems 142 and 144 send data in one or more bursts. The receive portions of the modems 142 and 144 are always connected to the voice channel so each modem can detect the beginning of any data burst that is sent by the other modem. However, the transmit portion of each modem 142 and 144 is connected to the voice channel only when a data burst is to be sent by the respective modem. Furthermore, when data is sent, the audio interface unit 132 in the mobile unit 102 disconnects the microphone 136 and/or the speaker 134 from the voice channel and the audio interface unit 138 in the message services equipment 108 disconnects the handset 140 from the voice channel, thus muting the voice signals to prevent voice-signal interference with the data channel and to prevent the conversing parties from hearing the data modulation.

Figure 2:
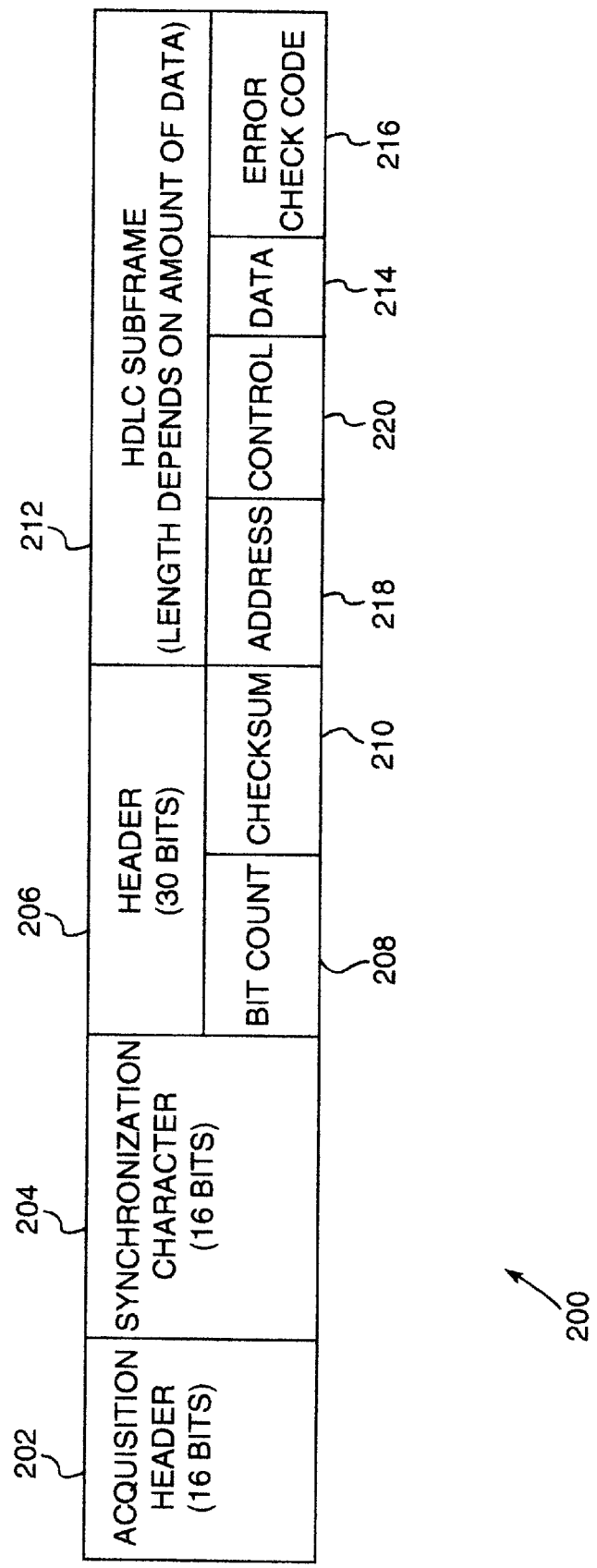
FIG. 2 is a diagram of a data burst.

FIG. 2 shows the format of a data burst 200. Each data burst 200 contains, preferably at its beginning, an "acquisition header" 202 to enable the receiving modems 142 and 144 to clock-synchronize with the bits of the data burst. Preferably, the acquisition header 202 contains the bit pattern 0101010101010101, which, we have determined, provides enough data transitions for the receiving modems 142 and 144 to clock-synchronize, but does not unnecessarily reduce the throughput capacity ("bit efficiency") of the data channel by using additional bits.

A "synchronization word" 204 preferably follows the acquisition header 202 and enables the receiving modems 142 and 144 to distinguish data signals from voice signals. Noise, fading and other imperfections in the voice channel can cause the receiving modems 142 and 144 to incorrectly receive one or more bits of the data burst 200. To compensate for these errors, the receiving modems 142 and 144 can treat ("recognize") a set of received bits as a synchronization word even if fewer than all of the bits match the expected synchronization word. An "error threshold" herein refers to the number of bits that can be in error while still recognizing a set of received bits as a synchronization word.

Increasing the length of the synchronization word and/or decreasing the error threshold reduces the likelihood of recognizing a synchronization word when none is actually received (a "false start"), but it raises the likelihood that a valid synchronization word will not be recognized (a "missed start"). A missed start causes the system to retransmit a data burst and, consequently, reduces the bit efficiency of the data channel. On the other hand, decreasing the length of the synchronization word and/or increasing the error threshold raises the likelihood of a false start, which causes the system to inappropriately, albeit temporarily, mute the voice signals. We have determined that, in a typical cellular telephone channel, a 16-bit synchronization word provides a reasonable tradeoff between erroneous recognition and failure to recognize a synchronization word. We prefer to use a variable error threshold, e.g. if the mobile unit controller 130 detects a high voice-to-data ratio, the controller can employ a larger error threshold to minimize disruption of the voice channel due to false starts without heavily impacting the data rate and, conversely, if the voice-to-data ratio is low, a smaller error threshold reduces the likelihood of retransmission and, therefore, increases the bit efficiency of the data channel without heavily impacting the voice signals.

A header 206 follows the synchronization word 204 in the data burst 200. The header 206 contains a bit count 208 of the number of data bits contained in the data burst 200 and a checksum 210 of the bit count 208. If the received checksum 210 fails to match the checksum calculated based on the received bit count 208, the voice signals are unmuted and the remainder of the data burst 200 is ignored. Thus, the checksum 210 provides an additional safeguard against erroneously recognizing a data burst or incorrect length. Optionally, the mobile unit controller 130 can adjust the error threshold in response to the rate of false starts, i.e. the controller can increase the error threshold if the controller detects a high rate of false starts.

An HDLC (high-level data link control) subframe 212 follows the header 206 in the data burst 200. The HDLC subframe transports data 214 according to a modified X.25 HDLC standard, i.e., without start/stop flags and without data transparency. Optionally, the data 214 can be encrypted before being inserted into the HDLC subframe 212. If an error check code (or FCS) 216 fails to match the remainder of any received HDLC subframe 212, the receiving modems 142 and 144 discard the data packet and retransmission of the entire data burst 200 occurs. We prefer HDLC to other protocols because it is an industry-standard protocol that guarantees accurate data delivery and enables half-duplex operation with a minimal turn-around delay at data rates used by the system.

Optionally, if so requested by an application program (not shown), a (15,11) Hamming code is preferably used to add four parity bits to each group of 11 bits in the HDLC subframe 212 to produce a series of 15-bit code words in a process known as "encoding" or "forward error correction" (FEC). This FEC enables the receiving modems 142 and 144 to correct a single-bit error and to detect a double-bit error in any 15-bit code word. While other FEC schemes, such as a (7,4) code, are acceptable, we prefer to use a (15,11) code because it provides a good compromise between bit efficiency and an ability to correct error bits at a rate expected on a cellular telephone channel. This error correction mechanism also can provide an estimate of the data channel error rate to the application program. Preferably, the modems 142 and 144 use the following parity check matrix:

$$\overline{P} = \begin{bmatrix} 1 & 1 & 1 & 1 & 1 & 1 & 1 & 0 & 0 & 0 & 0 \\ 1 & 1 & 1 & 1 & 0 & 0 & 0 & 1 & 1 & 1 & 0 \\ 1 & 1 & 0 & 0 & 1 & 1 & 0 & 1 & 1 & 0 & 1 \\ 1 & 0 & 1 & 0 & 1 & 0 & 1 & 1 & 0 & 1 & 1 \end{bmatrix}$$

yielding the code generation matrix $\overline{G} = [\overline{I}_{11} : \overline{P}^T]$ where $\overline{I}_{11}$ is the identity matrix of dimension 11.

The sending modems 142 and 144 can interleave the bits of the HDLC subframe 212 to overcome errors that tend to occur in the bursts 200 carried over a fading, cellular telephone channel. The header 206 can also be forward error corrected and bit-interleaved.

Figure 3:
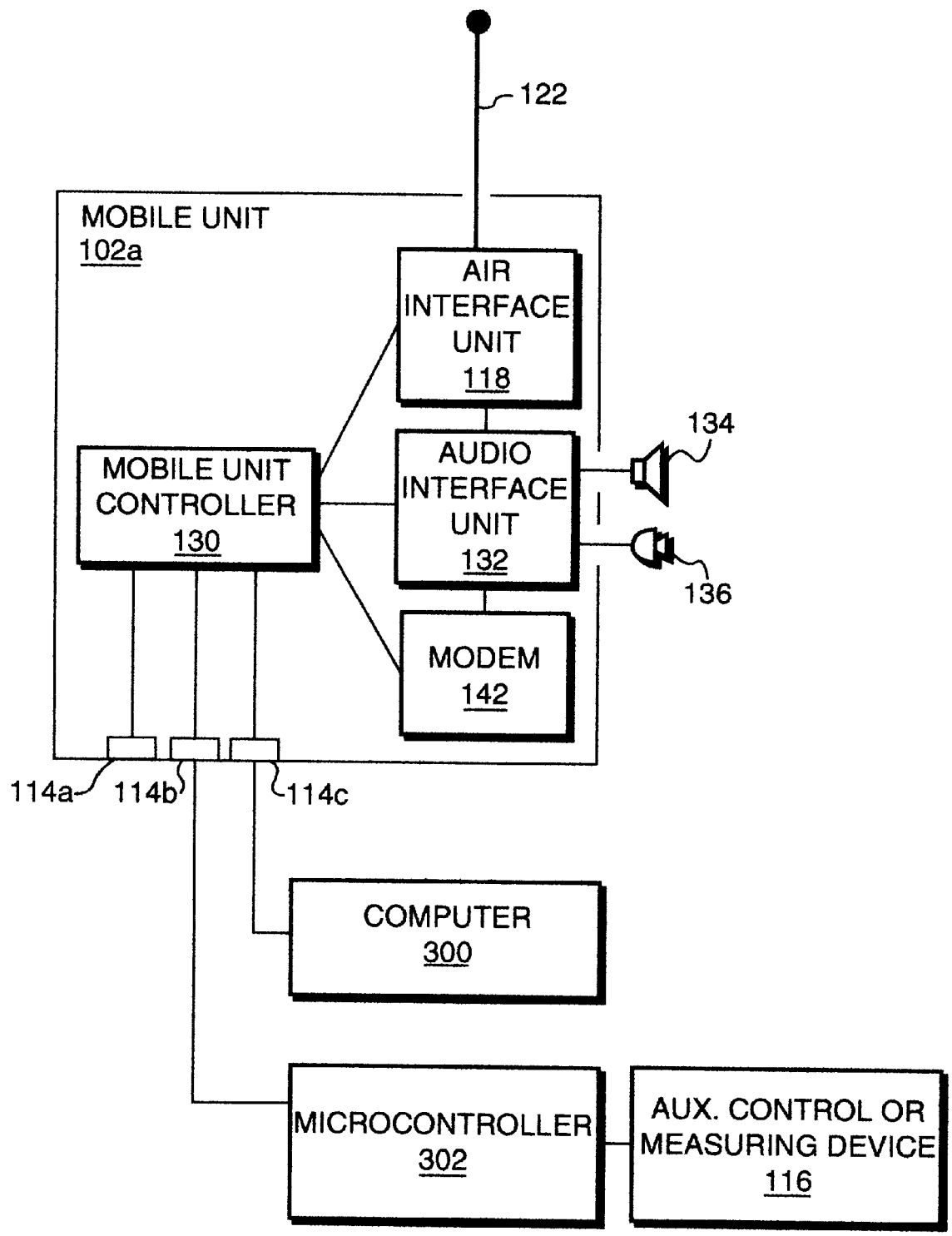
FIG. 3 is a block diagram of an alternate embodiment of a mobile unit.

HDLC can provide multiple logical data links over a single data channel by utilizing an address field 218 and a control field 220 (FIG. 2) to identify an intended recipient of the data burst 200. FIG. 3 illustrates an alternate embodiment of a mobile unit 102a to which multiple external data devices can be connected via data interfaces 114a–c, which are preferably standard multiple-pin sockets. The mobile unit controller 130 routes data received over the data channel to the addressed recipient, e.g., a computer 300 or a microcontroller 302. Similarly, the mobile unit controller 130 can route data to application software (not shown) executing in the mobile unit controller.

Figure 4:
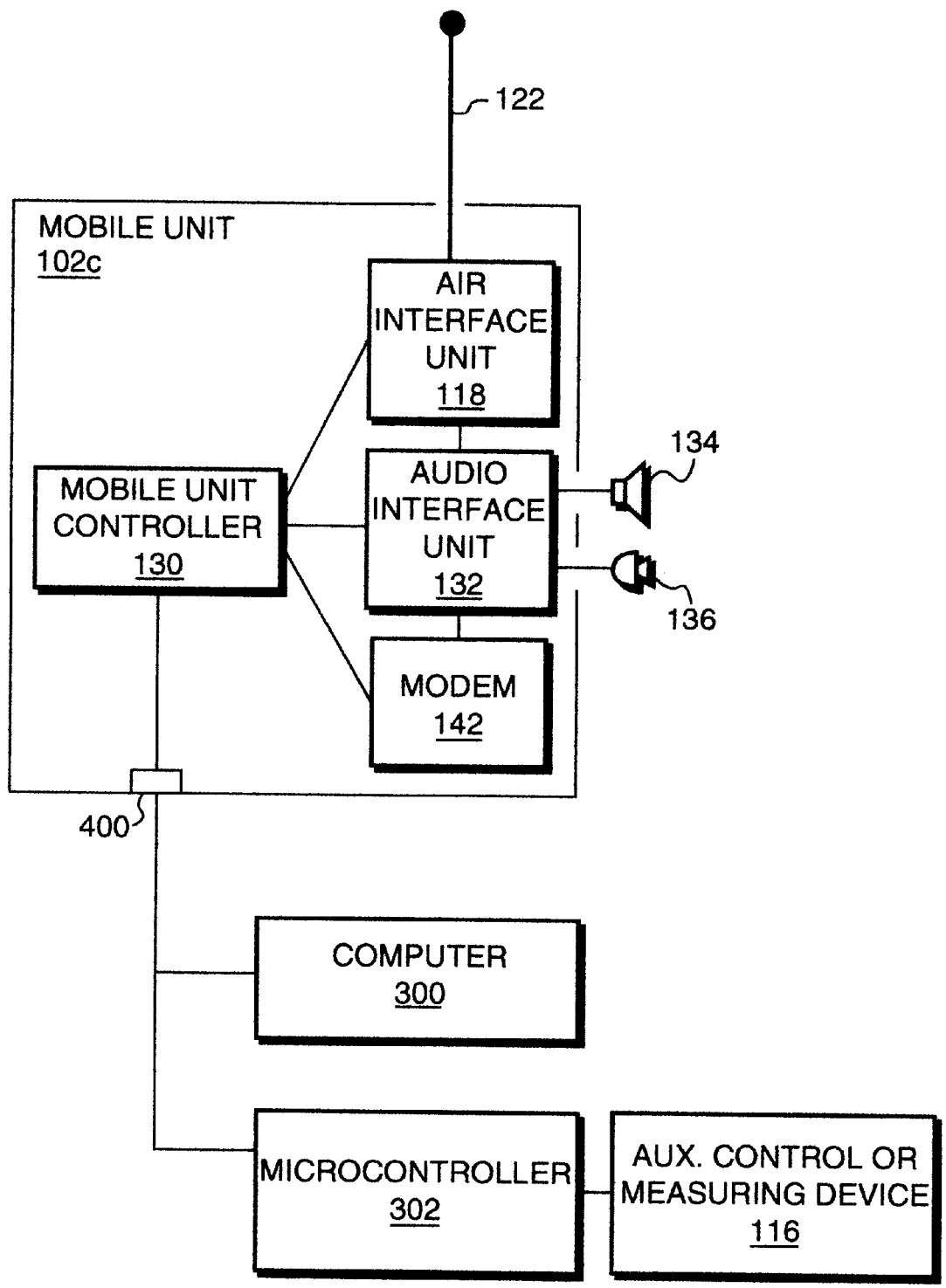
FIG. 4 is a block diagram of another alternate embodiment of a mobile unit.

Alternately, as shown in FIG. 4, the mobile unit controller 130 of a mobile unit 102c can route the data by providing a network connection 400 with one or more data devices, such as computer 300 and microcontroller 302 connected to the network connection.

Figure 5:
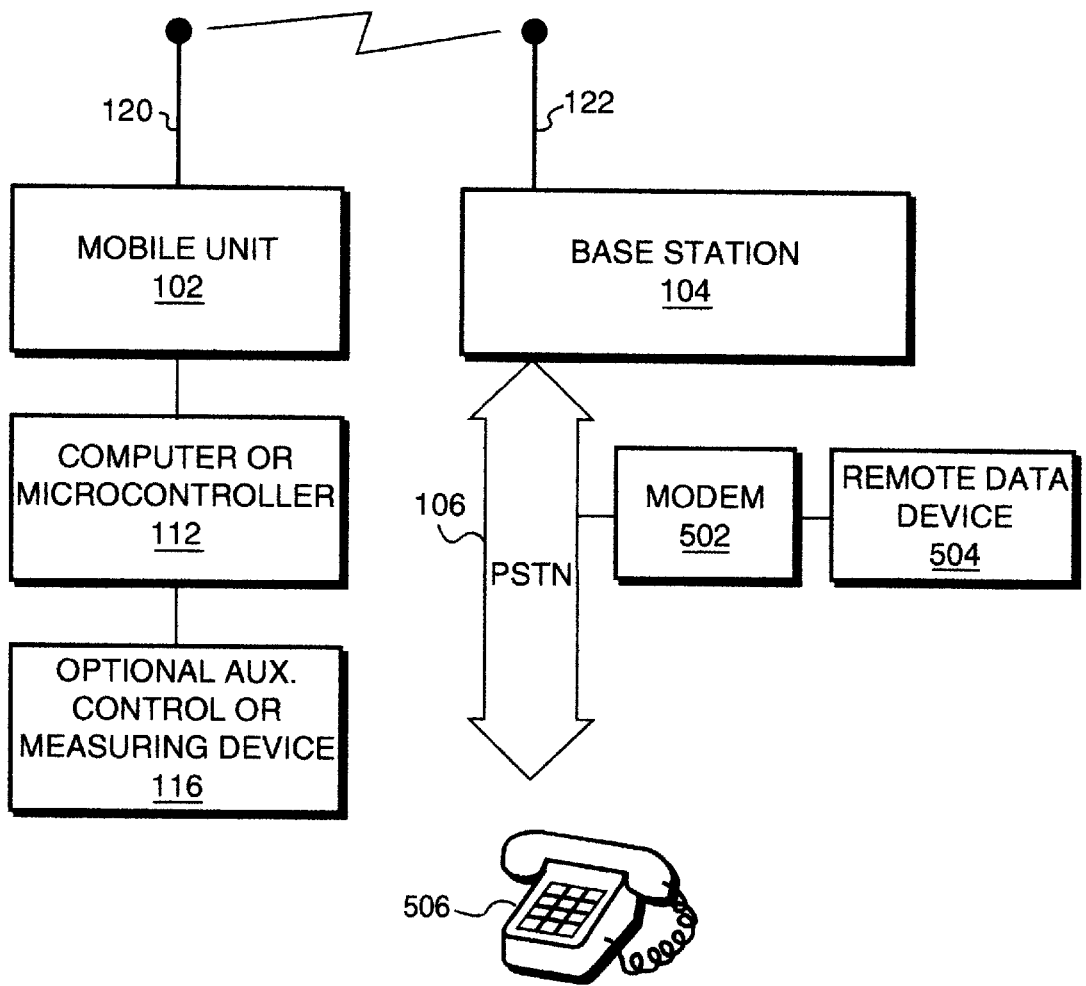
FIG. 5 is a block diagram of an alternate embodiment of the communication system of FIG. 1.

FIG. 5 illustrates another embodiment in which a modem 502 and a remote data device 504 are connected to the voice channel but are not necessarily co-located with a dialed or dialing unit 506. For example, as illustrated, the modem 502 and remote data device 504 can be in switching equipment (not shown) located within the PSTN 106.

The data channel established during a call need not be related to the dialed or dialing unit. For example, a remote data device can store electronic mail messages that are destined to a user and then forward the messages to the user's computer 112 (FIG. 1) whenever the user makes or receives a call over the mobile unit.

Numerous changes can be made in the system specifically described herein without departing from the scope of the invention. For example, protocols other than HDLC and error correction schemes other than Hamming block codes can be used. On some channels, error correction might not be necessary. Alternatively, the system can estimate an error rate over the data channel, provide the error rate to a data device and allow the data device to select whether error correction is to be performed.

What is claimed is:

1. A data communication system between first and second data devices, comprising:
   (a) a mobile telephone unit comprising a first modem connected to the first data device;
   (b) a base station in radio communication with the mobile telephone unit, the base station maintaining a voice channel for carrying voice signals between the mobile telephone unit and a dialed or dialing unit; and
   (c) a second modem connected to a point along the voice channel, the second modem being in data communication with the first modem, the first and second modems sending signals to and receiving signals from each other in bursts comprising a synchronization word being a 16-bit code and having a variable error threshold, and said synchronization word for enabling one of said modems that is receiving said burst to differentiate the burst from the voice signals carried over the voice channel, the voice signals being muted during each burst, and the second modem being connected to the second data device, whereby the first and second modems provide a data channel between the first and second data devices seemingly concurrently, and with minimal interference, with the voice signals that are being carried over the voice channel and without requiring modifications to the base station.

2. The communication system defined in claim 1, wherein each burst further comprises an acquisition header for enabling one of said first and second modems that is receiving a signal in said burst to clock-synchronize with the re-mainder of the burst.

3. The communication system defined in claim 2, wherein the acquisition header comprises between 12 and 20 bits.

4. The communication system defined in claim 1, wherein each burst further comprises a subframe for transporting data, the data comprising groups of data bits, the subframe comprising code words, wherein each group of data bits is encoded to form one of the code words.

5. The communication system defined in claim 4, wherein an FEC code is used to encode each group of data bits to form one of the code words.

6. The communication system defined in claim 5, wherein the FEC code is (15,11) Hamming.

7. The data communication system defined in claim 1, wherein the first and second modems use audio frequency-shift keying (AFSK) to send signals to and receive signals from each other.

8. A data communication system between a plurality of first data devices and a plurality of second data devices, comprising:
   (a) a mobile telephone unit comprising:
      (i) a first modem, and
      (ii) routing means for interconnecting the plurality of first data devices to the first modem:
   (b) a base station in radio communication with the mobile telephone unit, the base station maintaining a voice channel for carrying voice signals between the mobile telephone unit and a dialed or dialing unit; and
   (c) at least one second modem, each second modem being connected to a respective point along the voice channel, each second modem being in data communication with the first modem, the first modem sending signals to and receiving signals from each second modem in bursts comprising a synchronization word being a 16-bit code and having a variable error threshold, and said synchronization word for enabling one of said modems that is receiving the burst to differentiate the burst from the voice signals carried over the voice channel, each second data device being connected to one of the second modems, the voice signals being muted during each burst, whereby the system provides a logical data link between each first data device and a respective one of the second data devices.

9. The communication system defined in claim 8, wherein each burst further comprises an acquisition header for enabling one of said first and second modems that is receiving a signal in said burst to clock-synchronize with the remainder of the burst.

10. The communication system defined in claim 9, wherein the acquisition header comprises between 12 and 20 bits.

11. The communication system defined in claim 8 wherein each burst further comprises a subframe for transporting data, the data comprising groups of data bits, the subframe comprising code words, wherein each group of data bits is encoded to form one of the code words.

12. The communication system defined in claim 11 wherein an FEC code is used to encode each group of data bits to form one of the code words.

13. The communication system defined in claim 12, wherein the FEC code is (15,11) Hamming.

14. The communication system defined in claim 8, wherein the first and second modems use audio frequency-shift keying (AFSK) to send signals to and receive signals from each other.

15. A data communication system, comprising:
(a) a mobile telephone unit comprising a first modem;
(b) means, connected to the first modem, for displaying a message;
(c) a base station in radio communication with the mobile telephone unit, the base station maintaining a voice channel for carrying voice signals between the mobile telephone unit and a dialed or dialing unit;
(d) means for supplying a message; and
(e) a second modem connected to a point along the voice channel and to the means for supplying a message, the first and second modems being in data communication with each other, the first and second modems sending signals to and receiving signals from each other in bursts comprising a synchronization word being a 16-bit code and having a variable error threshold, and said synchronization word for enabling one of said modems that is receiving said modems that is receiving said burst to differentiate the burst from the voice signals carried over the voice channel, the voice signals being muted during each burst, whereby the first and second modems provide a data channel between the means for supplying a message and the means for displaying a message seemingly concurrently, and with minimal interference, with the voice signals carried over the voice channel and without requiring modifications to the base station.

16. The communication system defined in claim 15, wherein each burst further comprises an acquisition header for enabling one of said first and second modems that is receiving a signal in said burst to clock-synchronize with the remainder of the burst.

17. The communication system defined in claim 16, wherein the acquisition header comprises between 12 and 20 bits.

18. The communication system defined in claim 15, wherein each burst further comprises a subframe for transporting data, the data comprising groups of data bits, the subframe comprising code words, wherein each group of data bits is encoded to form one of the code words.

19. The communication system defined in claim 18, wherein an FEC code is used to encode each group of data bits to form one of the code words.

20. The communication system defined in claim 19, wherein the FEC code is (15,11) Hamming.

21. The data communication system defined in claim 15, wherein the first and second modems use audio frequency-shift keying (AFSK) to send signals to and receive signals from each other.

22. A mobile telephone unit for providing a voice channel for carrying signals between the mobile telephone unit and a dialed or dialing telephone unit and for providing, over the voice channel, a data channel between a first data device and a second data device connected to a second modem that is connected to a point along the voice channel, the mobile telephone unit comprising:
(a) a controller connected to the voice channel and
(b) a first modem connected to the controller,
   (i) for connection to the first data device:
   (ii) for sending signals to and receiving signals from the second modem in bursts comprising a synchronization word being a 16-bit code and having a variable error threshold for enabling one of said modems that is receiving said burst to distinguish the burst from the voice signals carried over the voice channel;
   (iii) for detecting the bursts sent over the voice channel by the second modem, and
   (iv) for distinguishing the bursts from voice signals, the controller muting the voice signals during each burst, whereby the first and second modems provide a data channel between the first and second data devices seemingly concurrently, and with minimal interference with the voice signals.

23. The communication system defined in claim 22, wherein each burst further comprises an acquisition header for enabling one of said first and second modems that is receiving a signal in said burst to clock-synchronize with the remainder of the burst.

24. The communication system defined in claim 23, wherein the acquisition header comprises between 12 and 20 bits.

25. The communication system defined in claim 22, wherein each burst further comprises a subframe for transporting data, the data comprising groups of data bits, the subframe comprising code words, wherein each group of data bits is encoded to form one of the code words.

26. The communication system defined in claim 25, wherein an FEC code is used to encode each group of data bits to form one of the code words.

27. The communication system defined in claim 26, wherein the FEC code is (15,11) Hamming.

28. The data communication system defined in claim 25, wherein the first and second modems use audio frequency-shift keying (AFSK) to send signals to and receive signals from each other.

* * * * *